C. W. MAYERS.
TRAP NEST.
APPLICATION FILED AUG. 8, 1914.

1,165,270.

Patented Dec. 21, 1915.

Witnesses
C. F. Rudolph
J. W. Ackman Jr.

Inventor
Clayton W. Mayers,
By Victor J. Evans
Attorney

UNITED STATES PATENT OFFICE.

CLAYTON W. MAYERS, OF DRESDEN, MAINE.

TRAP-NEST.

1,165,270.   Specification of Letters Patent.   Patented Dec. 21, 1915.

Application filed August 8, 1914. Serial No. 855,755.

*To all whom it may concern:*

Be it known that I, CLAYTON W. MAYERS, a citizen of the United States, residing at Dresden, in the county of Lincoln and State of Maine, have invented new and useful Improvements in Trap-Nests, of which the following is a specification.

This invention relates to improvements in trap nests and especially with reference to improved trap devices for attachment to and used in connection with any ordinary nest box for entrapping hens as they enter the nest boxes, the object of the invention being to provide improved trap devices of this character which are extremely cheap and simple, which may be readily attached to an ordinary nest box and which when not desired for use may be readily fixed in inoperative position.

The invention consists in the construction, combination and arrangement of devices hereinafter described and claimed.

Figure 1:
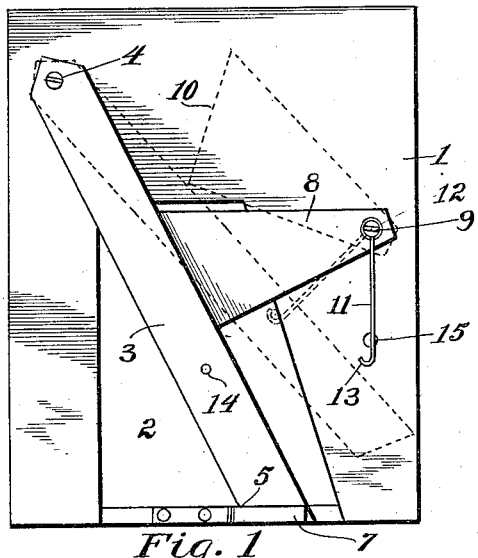
Figure 2:
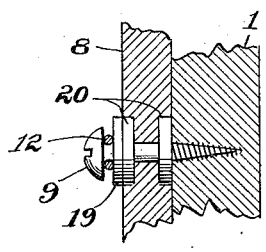
Figure 3:
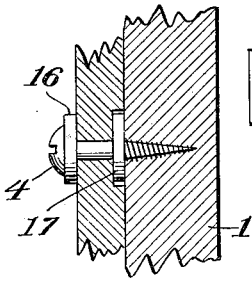
Figure 4:
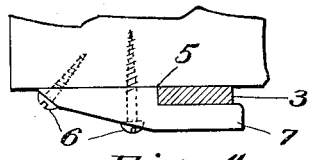
Figure 5:
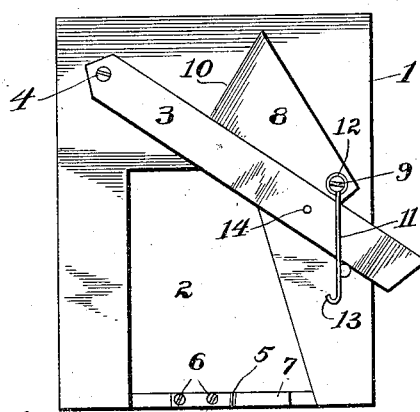

In the accompanying drawings:—Figure 1 is an elevation of a nest box provided with trap devices constructed in accordance with my invention and showing the trap devices sprung. Fig. 2 is a detail sectional view of the same on a plane disclosing the pivot screw of the fall. Fig. 3 is a similar view on a plane disclosing the pivot of the bar. Fig. 4 is a horizontal sectional view through the bar near its lower end and showing the stop in plan. Fig. 5 is an elevation on a smaller scale than that of Fig. 1 showing the trap devices arranged in inoperative position.

My improved trap devices may be used on any ordinary nest box, chicken house or the like, which has an opening in one side or end for the entrance of the hens. For the purposes of this specification I show an ordinary trap box 1 which is provided with an opening 2. This opening may be of the form here shown or of any other suitable form and its size and shape may be varied for different breeds of hens.

In accordance with my invention I provide a bar 3 which in practice is preferably made of wood and which is pivotally attached to the side or front of the nest box by means of a screw 4 the pivot screw being passed through an opening near the upper end of the bar and being secured to the wall, front or side of the nest box by being screwed into the same and at a point near and above the upper left hand corner of the entrance opening 2. The length of the bar is such that when the same drops it will be arranged diagonally across the entrance opening as shown in full lines in Fig. 1.

A stop 5 is provided to engage the lower end of the bar, the stop being also preferably made of wood, being of the shape shown in Fig. 4 and being secured to the front side of the nest box at a point below the opening and near the lower right hand corner thereof by means of screws or other suitable devices 6. This stop provides an arm 7 behind which the lower end of the bar can drop. I also provide a fall 8 which in practice is preferably made of wood but which may be made of any suitable material. This fall is here shown as and is preferably triangular in form but may be of any suitable shape. A pivot pin 9, which is here shown as a screw, passes through an opening near the smaller end of the fall and pivotally mounts the fall on the wall or side of the nest box and at a point at the right hand side of the bar, the pivot 9 being attached to the wall at a point near the upper right hand corner of the opening 2. The length of the fall is such that when lowered its broadened free end 10 is adapted to bear against the bar and when raised, together with the bar, the lower pivot and left hand corner of the fall is adapted to bear against the bar as shown in dotted lines in Fig. 1.

To hold the bar in elevated position and thus cause the same to so clear the opening 2 as to permit ready passage of a hen through the opening, I provide a link 11 which is here shown as a wire pivotally mounted at one end on the screw 9 as at 12 and provided at the opposite end, which is free, with an upturned hook 13. The bar has a stud 14 projecting from its outer side which when the bar is raised may be engaged by the hook to secure the link thereto and thus cause the link to hold the bar in elevated or set position.

When a hen enters the nest box through the opening 2 owing to the partial obstruction of the opening formed by the bar when the latter is in set position the body of the hen will slightly raise the bar thereby relieving the tension of the stud 14 on the hook of the link and hence releasing the free end of the link, whereupon the bar will drop by its own gravity across the opening as shown in full lines and become engaged at its lower end by the stop 5 and the fall 8 also drops on the side of the bar next the pivot of the fall, the fall being thus arranged substantially at right angles to the bar and hence securely holding the same in spring position as shown.

When it is desired to discontinue the use of the trap devices they may be arranged as shown in Fig. 5 with a nail or pin engaged under the free end of the bar and in an opening 15 in the wall of the nest box and with the fall parallel with and lying on the upper side of the bar. Preferably the pivot screw 4 of the bar is provided with washers 16—17 which respectively bear on the outer and inner sides thereof and with the washer 17 in a recess on the inner side of the bar as shown in Fig. 2.

The pivot screw 9 which forms the attachment for the link 11 is preferably provided with a flanged stud 18 for engagement by the wire of the link and with washers 20 on the outer and inner sides of the fall recessed therein.

My improved trap devices are extremely cheap and simple, may be manufactured and sold at very slight cost and may be readily applied to any ordinary nest box or the like structure for use in connection therewith.

Having thus described my invention, I claim:—

A trap device for a nest box comprising a board having an opening therein, a trap bar pivotally secured to said board on the outer face thereof above and to one side of the opening therein and extending when sprung diagonally across said opening to form a closure therefore, and adapted to lie slantingly across the upper part of said opening when set, a lock for said bar comprising a fall pivotally secured to the board slightly below the opening therein and held elevated by said bar, a link adapted to engage said bar to hold the same in set relation, and upon upward movement of said bar to fall away therefrom, whereupon the trap is sprung and said bar falls across the said opening and is locked by the dropping into place of the fall.

In testimony whereof I affix my signature in presence of two witnesses.

CLAYTON W. MAYERS.

Witnesses:
JOHN H. MAYERS,
J. LLOYD MAYERS.